United States Patent Office 3,558,781
Patented Jan. 26, 1971

3,558,781
DIPROPYLACETAMIDO-2-PYRIMIDINE IN COMPOSITIONS AND METHODS FOR INDUCING SEDATION OR TRANQUILIZATION
Henry E. Meunier, Grenoble, and Pierre Luc Eymard, Fontaine, France, assignors to Laboratories J. Berthier S.A., Grenoble, France, a French company
No Drawing. Continuation-in-part of application Ser. No. 675,063, Oct. 13, 1967. This application Sept. 5, 1969, Ser. No. 855,776
Claims priority, application France, Oct. 20, 1966, 80,800
Int. Cl. A61k 27/00
U.S. Cl. 424—251
5 Claims

ABSTRACT OF THE DISCLOSURE 2-dipropylacetamido pyrimidine is described as a tranquilizing agent.

CROSS-REFERENCE TO RELATED APPLICATION

This application is a continuation-in-part of our co-pending application Ser. No. 675,063 filed Oct. 13, 1967, now abandoned.

SUMMARY OF THE INVENTION

This invention relates to compositions and methods for inducing tranquilization and/or sedation in mammals and for potentiating tranquilization or sedation in such animals. More particularly the invention relates to pharmaceutical compositions containing dipropylacetamidopyrimidine and to methods of inducing tranquilization and/or sedation with said compound.

It is an object of the present invention to provide a new medicament, particularly a compound having tranquilizing properties, namely, dipropylacetamido pyrimidine. It is a derivative of the ester of dipropylacetic acid and 2-amino pyrimidine and hereafter is designated B.46.65.

The product which is the object of the invention can be administered orally in the form of wafers, compressed tablets, sugar-coated pills, capsules, diluted with the usual and convenient excipients according to the desired pharmaceutical form, and in doses of 100 to 1,000 mg. per unit. More generally, it can be administered by all convenient modes (orally, rectally, parenterally or otherwise), in the presence of customary excipients necessary for the preparation of the selected form of administration.

DETAILED DESCRIPTION OF INVENTION

The following examples are presented in order to disclose the invention more fully. It should be understood, however, that they are not intended to limit the invention in any way.

PROCESS OF PREPARATION

For the preparation of the compound of the invention one can proceed in two different ways: either in the absence of solvent, or in the presence of pyridine. In either case the final product obtained gives the same melting point, the same infrared spectrum and a similar spot in thin layer chromatography; thus, it is the same product.

EXAMPLE I

In the process of synthesis without solvent, one can utilize, as starting materials, 2 moles of 2-amino pyrimidine and 1 mole of dipropylacetic acid chloride. The reaction can be represented by the following equation:

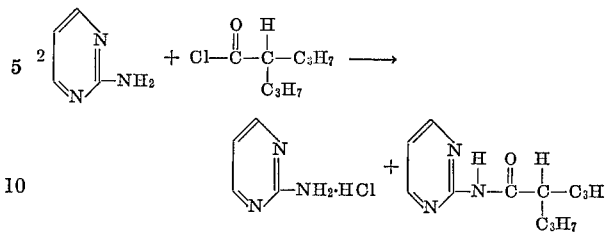

In a preferred manner of carrying out the invention, the starting materials are mixed and are heated for one hour at 60°–70° C. Then an alkaline extraction with ethyl ether is made, the base used being aqueous sodium hydroxide. The ethereal phase, on evaporation, gives a product A which is purified by recrystallization in ethyl alcohol or ethyl ether.

The purity of the product is verified by thin layer chromatography, the best system of chromatography found being the following:

Adsorbent—Aluminum oxide G of Merck
Eluent—Chloroform-acetone 8:2
Developer—Iodine vapor The melting point is 101° C. after recrystallization.
The analysis of the amide corresponding to the formula $C_{12}H_{19}ON_3$ gives the following results:
Calculated (percent): C, 65.15; H, 8.6; N, 19.0. Found (percent): C, 65.08; H, 8.65; N, 19.01.

Also, the amide that is the object of the invention is characterized by making infrared spectra of 2-amino pyrimidine, of dipropylacetic acid and of product A, in chloroform. The spectrum of product A is different from those of the two others in that it presents:

(a) The peaks for $CH_3$, $CH_2$, CH in the zone of 2800 cm.$^{-1}$ to 300 cm.$^{-1}$ which are due to the grouping

(b) The peak of 3,400 cm.$^{-1}$ which corresponds to NH (c) The peaks at 1,700 cm.$^{-1}$ and 1,670 cm.$^{-1}$ due to

(d) The large absorption peak typical of pyrimidine from 715 cm.$^{-1}$ to 800 cm.$^{-1}$.

On the other hand, the peaks of 3,450 cm.$^{-1}$ and 1,610 cm.$^{-1}$ of $NH_2$ of the 2-amino pyrimidine no longer exist.

The obtained product A is therefore the following amide:

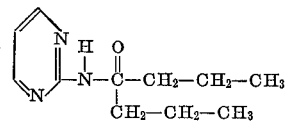

In the method of preparation in the presence of a solvent, the mixture of reactants is heated in pyridine for an hour at 60°–70° C. After a partial evaporation of the pyridine under vacuum, the hydrochloride of pyrimidine precipitates, the remainder is filtered and is evaporated. Thus is obtained a solid product that is recrystallized in alcohol and which is designated as B. It shows the same melting point, the same I.R. spectrum and gives the same spot in thin layer chromatography as the product obtained in the absence of pyridine. Therefore, in both cases it is the same amide. The yield is 60% of the theoretical yield.

EXAMPLE II

Pharmacological tests

For all the pharmacological tests, an oily solution of 200 mg./ml. of B.46.65 in olive oil has been used for intraperitoneal injections. For controls or products of reference the minor tranquilizer Meprobamate and the major tranquilizer Chlorpromazine have been used.

(1) Toxicity

The acute toxicity, $LD_{50}$, determined on the mouse, intraperitoneally, by utilizing the method of Karber and Behrens is 821 mg./kg. The $LD_{50}$ in the same conditions for Meprobamate is in the area of 550 mg./kg.

(2) Hypnotic properties

The $HD_{50}$ calculated by the method of Karber and Behrens is 298 mg./kg. In the same conditions, the $HD_{50}$ of Meprobamate is about 215 mg./kg.

(3) Potentiating action

Tests to determine the potentiating action of B.46.65 have been carried out with Nembutal and with Chloral by proceeding in the following manner:

(A) With Nembutal 50 mg./kg. of B.46.65 in oily solution is injected, intraperitoneally, into lots of 10 mice, a quarter of an hour before injecting, subcutaneously, 50 mg./kg. of Nembutal in aqueous solution. One measures the time it takes to fall asleep and also the time of sleeping. On awakening, the animals receive, intraperitoneally, a new dose of 50 mg./kg. of B.46.65, and one measure the speed and the duration of an eventual sleeping condition. The action of the product is compared to that of Meprobamate tested in the same conditions at the dose of 100 mg./kg., I.P.

(B) With Chloral

Lots of 10 mice receive 50 mg./kg. of B.46.65 in oily solution, I.P., and a quarter of an hour later, 320 mg./kg. of Chloral in aqueous solution at 30 mg./ml. As in the test with Nembutal, one measures the time to fall asleep and the duration of sleep. As previously, the mice receive, on awakening a new dose of 50 mg./kg. of B.46.65 and one measures the speed and the duration ensuing of the sleep.

The results of tests on Nembutal and Chloral are recorded in Tables I and II, respectively.

TABLE I

| Products, lots of 10 mice | Average time to sleep condition, minutes | Average duration of sleep | Average time to return to sleep condition, minutes | Duration of 2nd sleep |
|---|---|---|---|---|
| Controls (Nembutal only) | [1] 17 | 51 min | | |
| B.46.65 and Nembutal | 12 | 2 hrs., 25 min | [2] 10 | 23 min. |
| Meprobamate and Nembutal | 12 | 3 hrs., 28 min | [3] 12 | 1 hr., 12 min. |

[1] 4 animals did not fall asleep.
[2] 1 animal only fell asleep again.
[3] 5 animals fell asleep again.

TABLE II

| Products, lots of 10 mice | Average time to sleep condition, minutes | Average duration of sleep | Average time to return to sleep condition, minutes | Duration of 2nd sleep |
|---|---|---|---|---|
| Controls (Chloral only) | 0 | 0 | | |
| B.46.65 and Chloral | 3 | 5 hrs., 49 min | [1] 1 | 23 min. |

[1] Only 1 animal fell asleep again.

(4) Tranquilizing properties

The study of tranquilizing properties has been carried out on mice which have been submitted to a battery of tests currently employed in Europe.

(A) Flight test

This test permits the determination of the explorative possibilities of the animals. One uses a plywood parallelepiped box without a top into which descends an inclined plane, also of plywood, covered with a fine mesh. This plane has a horizontal reference line two centimeters beneath the level where it is supported on the edge of the enclosure. The assembly is placed in an artificially lighted room away from all intense noise. A "sortie" of a mouse constitutes a complete crossing of the reference line in the upward direction. The animals are introduced by groups of four and are kept at the bottom of the enclosure for 10 seconds by a small, removable board. For each mouse, one notes the time to the first "sortie" and the total number of "sorties" per minute for five minutes. This is also done under the effect of Meprobamate. The results of this test are recorded in Table III.

TABLE III

| Lots of 32 animals | Time of first sortie | Average No. of sorties completed in— | | | | | Average of total sorties |
|---|---|---|---|---|---|---|---|
| | | 1 min. | 2 min. | 3 min. | 4 min. | 5 min. | |
| Controls | 22″ | 1.62 | 1.78 | 1.15 | 1.06 | 1.09 | 6.72 |
| B.46.65, 150 mg./kg | 2′22″ | 0.28 | 0.31 | 0.37 | 0.31 | 0.12 | 1.43 |
| B.46.65, 100 mg./kg | 33″ | 1.59 | 1.37 | 0.75 | 0.65 | 0.56 | 4.93 |
| B.46.65, 50 mg./kg | 20″ | 2 | 1.5 | 1.09 | 0.84 | 0.68 | 6.12 |
| Meprobamate, 150 mg./kg | 2′11″ | 0.51 | 0.77 | 0.68 | 1.06 | 0.97 | 3.99 |
| Meprobamate, 100 mg./kg | 44.3″ | 1.37 | 1.84 | 2.06 | 2.25 | 2.22 | 9.75 |

Thus, one notes a very superior effectiveness in comparison with Meprobamate.

(B) Test of the board with hole

This test permits a quantitative appreciation of the reaction of exploration in relation to the curiosity of the animal.

The equipment is formed by a board 40 cm. x 40 cm. and 1.7 cm. thick in which are 16 holes, each of 3 cm. diameter. This board is supported on 4 feet, sufficiently elevated (1.5 m.) so that the holes will appear bottomless to the animals, and the test is carried out as silently as possible. Each mouse is placed at the center of the board and one notes the number of times it inserts its head in a hole. The number of holes explored is recorded at the end of 1, 2, 3, 4 and 5 minutes.

The results of this test are in Table IV.

TABLE IV

| Lots of 25 animals | Average No. of holes explored in— | | | | | Average No. of holes explored |
|---|---|---|---|---|---|---|
| | 1 min. | 2 min. | 3 min. | 4 min. | 5 min. | |
| Controls | 6.84 | 5.16 | 4.92 | 4.88 | 4.60 | 26.4 |
| B.46.65, 100 mg./kg | 6.33 | 4.22 | 4.70 | 3.81 | 3.66 | 22.7 |
| B.46.65, 150 mg./kg | 3.76 | 3.48 | 3.48 | 2.32 | 2.52 | 14.08 |
| Meprobamate, 150 mg./kg | 2.80 | 2.16 | 2.32 | 2.32 | 2.32 | 12.4 |

(C) The chimney test

This test permits the appreciation of two groups of factors: (1) Neuromuscular factors (muscular force, agility, coordination of movements); and (2) Psychic factors (curiosity, fright, instinct of flight).

It consists of introducing mice successively, head first into a cylinder 30 cm. long and calibrated as a function of the size of the mouse, so that by a lateral movement backwards they can leave in less than 30 seconds. The percentage of animals incapable of carrying out this performance is noted. Meprobamate and Chlorpromazine are tested under the same conditions comparatively with B.46.65. The results of this test are reported in Table V. The figures in the columns 10 min., 30 min., 60 min., . . . correspond to the percentage of mice that have failed the test, that is to say, that have not succeeded in leaving the cylinder in less than 30 seconds.

TABLE V

| Products, lots of 10 animals | Doses, mg./kg. | Time elapsed since the injection | | | | |
|---|---|---|---|---|---|---|
| | | 10 min. | 30 min. | 60 min. | 90 min. | 120 min. |
| Controls | 0 I.P. | 0 | 0 | 0 | 0 | 0 |
| B.46.65 | 100 I.P. | 0 | 40 | 40 | 40 | 20 |
| B.46.65 | 150 I.P. | 80 | 50 | 50 | 50 | 40 |
| B.46.65 | 200 I.P. | 80 | 80 | 80 | 60 | 60 |
| Meprobamate | 150 I.P. | 80 | 100 | 100 | 70 | 60 |
| Chlorpromazine | 10 orally | 100 | 100 | 100 | 100 | 90 |

(D) Test of the turning shaft

This test of equilibration determines the aptitude of the animals to coordinate their movements. It consists of determining the time during which mice hold their own on a wooden cylinder of 4.8 cm. diameter turning at a speed of 4 revolutions per minute. The cylinder has a slightly rough surface so that the animals do not slide off.

The results obtained are summarized in Table VI in which the figures in columns 10 min., 30 min., 60 min., . . . correspond to the percentage of animals that have failed the test, that is to say, to the percentage of mice who have not held on for at least two minutes on the cylinder after three tries.

TABLE VI

| Products, lots of 10 animals | Doses, mg./kg. | Time elapsed after the injection | | | | |
|---|---|---|---|---|---|---|
| | | 10 min. | 30 min. | 60 min. | 90 min. | 120 min. |
| Controls | 0 | 0 | 0 | 0 | 0 | 0 |
| B.46.65 | 100 I.P. | 0 | 20 | 0 | 0 | 0 |
| B.46.65 | 150 I.P. | 70 | 20 | 20 | 0 | 0 |
| B.46.65 | 200 I.P. | 100 | 40 | 0 | 0 | 0 |
| Meprobamate | 150 I.P. | 60 | 100 | 100 | 80 | 60 |

(E) Test of traction

This test demonstrates the functions of equilibration as well as muscular tonus and force.

It consists of suspending mice by the front paws by a metallic wire held horizontally. The time necessary for the animals to effect a recovery is noted, that is to say, in order to place at least one of the hind paws on the wire.

The results obtained are summarized in Table VII in which the figures in the last four columns indicate the percentage of mice incapable of effecting a recovery in less than 10 seconds.

TABLE VII

| Products, lots of 10 mice | Doses, mg./kg. | Time elapsed since the injection | | | |
|---|---|---|---|---|---|
| | | 0 min. | 30 min. | 60 min. | 90 min. |
| Controls | 0 | 0 | 0 | 0 | 0 |
| B.46.65 | 100 I.P. | 0 | 30 | 10 | 10 |
| B.46.65 | 150 I.P. | 0 | 60 | 60 | 50 |
| Chlorpromazine | 10 orally | 0 | 80 | 100 | 100 |

(F) Test of swimming

This test demonstrates the survival time of "tranquilized" mice in comparison with control mice when the animals are plunged into a tank filled with water at 16° C. The control mice drown much more quickly because they are maddened, moving in an unrestrained manner and quickly tiring themselves. The results of this test are summarized in Table VIII.

TABLE VIII

| Products, lots of 10 mice: | Doses, mg./kg. | Temperature of the water | Time at the end of which the mice drown |
|---|---|---|---|
| Controls | 0 | 16° C.±1 | 6′2″ |
| B.46.65 | 150 I.P. | 16° C.±1 | 9′3″ |

(5) Action on the central nervous system and neuroplegic properties

The effect on the central nervous system is determined with the aid of the following tests:

(A) Test of "waltzing" mice

The I.P. injection of an aqueous solution of iminodipropionitrile (I.D.P.N.) in the following sequence and doses: 1 g./kg. the first day; 1 g./kg. the second day; nothing the third day and 1 g./kg. the fourth day. Beginning with the fourth day, an abnormal state of agitation is provoked in the treated mice, then in the days following, an irreversible hyperkinetic syndrome, characterized by circular running (waltzing mice) with some retro and lateral movements and chorea-athetosic movements of the head. This state is irreversible. These animals are treated comparatively with B.46.65, with Meprobamate and Chlorpromazine and one tests the suppression of this pathologic syndrome.

In the lot of 10 waltzing mice having received 200 mg./kg. of B.46.65 intraperitoneally each mouse no longer turns 5 minutes after the injection. A nociceptif stimulus makes them go off again for several seconds, then they stop anew. On an average, they start to turn again spontaneously 1 hr. 9 min. after the injection of B.46.65. In the lot of 10 waltzing mice that received 100 mg./kg. of B.46.65 intraperitoneally one mouse did not stop turning; the others stopped, on the average, for 10′ to 8′ after the injection.

In the lot of 10 waltzing mice having received 100 mg./kg. of Meprobamate intraperitoneally, no mouse stopped completely but they evidenced rather some periods of tranquillity interrupted by short phases of resumption of activity. On an average, the arrest is produced after 16′ and the free resumption of circular movements is produced after 1 hr. 17′. However, two mice were practically not arrested.

In the lot of 10 waltzing mice having received 100 mg./kg. of Chlorpromazine intraperitoneally all the mice were arrested in an average time of 10′ after the injection and the circular movements only resumed after 3 hr. 36′.

(B) Antagonism with amphetamine. Effect on the group toxicity

An atoxic dose of 30 mg./kg. of amphetamine sulfate, for example, administered in aqueous solution intraperitoneally to mice placed in individual cages can involve an increased mortality if the mice are placed in sufficient number in the same cage. Under the effect of psychic excitation provoked by the product, the grouped mice madden themselves mutually and end by dying of exhaustion and of fear. One has therefore sought to antagonize the effects of amphetamine by administering, ½ hr. before, 200 mg./kg. of B.46.65 intraperitoneally in oily solution.

The same test, comparatively, is effected with Meprobamate.

The results of this test are summarized in Table IX.

TABLE IX

| Products, lots of 10 grouped mice | Number of deaths in 20 hrs. | Percentage of deaths |
|---|---|---|
| Controls, Amphetamine sulfate, 30 mg./kg. | 7 | 70 |
| B.46.65, 200 mg./kg., I.P. Amphetamine sulfate, 30 mg./kg., ½ hr. after | 4 | 40 |
| Meprobamate, 100 mg./kg., I.P. and Amphetamine sulfate, 30 mg./kg., ½ hr. after | 9 | 90 |
| Meprobamate, 100 mg./kg., I.P. amd Amphetamine sulfate, 30 mg./kg., at the same time | 4 | 40 |

(C) Test of resistance to asphyxia (test of Nassenef)

The mice are placed individually in little jam jars closing hermetically and one notes the time at the end of which they die from asphyxia. Under these conditions, one sees that the control animals die more rapidly than those having received a dose of product capable of protecting their nerve cells from the intoxication due to carbon dioxide and to the lack of oxygen. A half hour before the test a lot of animals was treated with B.46.65 at a dose of 200 mg./kg., intraperitoneally, in oily solution, and another lot with Meprobamate, 200 mg./kg. in the same way, in oily solution.

The results obtained are summarized in Table X.

TABLE X

Products, lots of 10 mice:     Average time to death by asphyxia
Controls _____ 52′
B.46.65, 200 mg./kg., I.P. _____ 1 hr. 44′
Meprobamate, 200 mg./kg., I.P. _____ 1 hr. 42′

(6) Action on experimental restraint to ulceration (A) Ulceration by exertion

Rats are put to sleep with ether, then they are immobilized in flexible wire cloth. The four paws are passed through holes cut for this purpose, then attached in pairs with the aid of adhesive tape, so that the animal cannot budge. At the moment of retraint 2.5 ml. of physiologic serum is injected intramuscularly. Under these conditions, in 20 hours all rats developed one or more gastric ulcers accompanied by generally large hemorrhages.

An attempt was made to protect the animals from ulcers or, at least, to lessen it by injecting them intraperitoneally at the start of the experiment with 200 mg./kg. of B.46.65 in oily solution.

The same test was repeated with Meprobamate in a dose of 100 mg./kg., intraperitoneally, in aqueous solution.

To evaluate the activity of the product the following classification has been adopted: 0—normal stomach; 1—hemorrhagic spots without ulcers; 2—one ulcer; 3—many ulcers; 4—perforation.

Lots of 5 animals have been used. Under these conditions the results obtained are as follows:

TABLE XI

| Classification: | Controls | B.46.65, 200 mg./ kg., I.P. | Meprobamate 100 mg./kg., S.C. |
|---|---|---|---|
| 0 | | | 1 |
| 1 | | | 1 |
| 2 | | | |
| 3 | 5 | 5 | 3 |
| 4 | | | |

(B) Ulcers of electrical constraint

The rats are left for 24 hours in a Plexiglas cage the floor of which consists of metal bars receiving an alternating current of an intensity in the area of 40 volts. The bars alternately contact the two poles of current so that the animal only makes contact and receives the current if it puts its paws on two neighboring bars, that is to say on two bars of opposite polarity. After a period of habituation the animals seek a favorable position and then remain perfectly motionless because of fear of receiving an electric discharge.

Under these conditions, all the animals are victims, within 24 hours, of more or less serious alterations of the gastric mucosa. As in the preceding test and at the same doses an attempt has been made to protect the animals by the administration at the time of entry into the cage, of B.46.65 or of Meprobamate.

The results obtained are summarized in Table XII.

TABLE XII

| Classification: | Controls | B.46.65, 200 mg./ kg., I.P. | Meprobamate 100 mg. kg., S.C. |
|---|---|---|---|
| 0 | | | |
| 1 | | 2 | 4 | 2 |
| 2 | | 2 | 1 | 3 |
| 3 | 1 | | |
| 4 | | | |

(7) Conclusion of the pharmacological tests

B.46.65 possesses interesting pharmacological properties at doses sufficiently remote from toxic doses, which tend to class it as a tranquilizer. It possesses, in effect, at sufficient dose, hypnotic properties and the property of potentiating hypnotic drugs. According to the tests of tranquilizing activity the results obtained are often comparable to those of Meprobamate, frequently superior.

Finally, the results obtained in other tests, notably in the test with iminodipropionitrile, allow a glimpse of certain neuroplegic properties which place the product half way between the "minor" tranquilizers (Meprobamate type) and the "major" tranquilizers (Chlorpromazine type).

CLINICAL OBSERVATIONS

Three additional examples of the applications of the tranquilizing effect of the product of the invention are cited by way of illustration and not limitation.

EXAMPLE III

A manual workman, 35 years old, alcoholic for several years, suffering from muscular pains, from slight liver enlargement, from morning phlegm, from insomnia and from irritability receives two pills of 500 mg. at night before bedtime. One observes a resumption of sleep, the disappearance of irritability, the lessening of muscular pains, but no effect on morning phlegm.

EXAMPLE IV

A woman of 30 years, married, having acute family problems, and suffering from anxiety, from anguish, from palpitations, from insomnia, from difficulty of falling asleep, receives ½ pill of 500 mg. in the morning, ½ pill of 500 mg. at noon, and one pill of 500 mg. at night before bedtime. One observes a dedramatization of her situation, an improved objectivity, a refreshing sleep and the disappearance of the train of accompanying troubles.

EXAMPLE V

A student of 23 years of age manifests at exam time an increasing anxiety, panic, agitation, trembling and sweating of the extremities, laryngeal constriction, palpitations and insomnia because of anxiety. One has been able to establish a disappearance of these symptoms following a treatment comprising: (1) the first day: ½ pill of 500 mg. in the morning, ditto at noon and ditto at night. (2) The second day: one pill of 500 mg. in the morning and one hour before the examination.

Others may practice the invention in any of the numerous ways which will be suggested by this disclosure to one skilled in the art of employing one or more of the novel features disclosed or equivalents thereof. All such practice of the invention is considered to be a part hereof provided it falls within the scope of the appended claims.

EXAMPLE VI (A) Compressed tablets of dipropylacetylamino pyrimidine are prepared from a tablet mix containing 400 grams of dipropylacetylamino pyrimidine, 150 grams of microcrystalline cellulose and 50 grams of aluminum stearate. When pressed into tablets weighing 300 milligrams, they provide a dosage of 200 milligrams of the medicinal agent.

(B) A thorough mixture of 800 grams of dipropylacetylamino pyrimidine, 60 grams of talc and 10 grams of magnesium stearate was filled into No. 0 gelatin capsules. The dosage was 400 mg. of the drug per capsule.

(C) Eighty grams of dipropylacetylamino pyrimidine and 20 grams of methylcellulose were stirred into 1 kg. of simple syrup containing 800 mg. of methyl p-hydroxybenzoate and 200 mg. of propyl p-hydroxybenzoate. A stable emulsion was formed. A daily dosage of 1 to 2 ml. of this preparation per os is adequate as a tranquilizers and is adequate for adults.

(D) Suppositories, 2-gram size, were formed from a dispersion of 800 grams of finely powdered dipropylacetylamino pyrimidine in 2 kg. of cocoa butter. Each suppository, administered rectally, provides an adult dosage.

(E) Wafers or tablets, each containing 500 mg. of dipropylacetylamino pyrimidine, can be produced by compounding 100 grams of the medicinal agent with 30 grams of corn starch, 10 grams of magnesium stearate and 10 grams of talc into a tablet mix and pressing 750-mg. tablets or wafers for oral or buccal administration.

We claim:
1. A method of inducing sedation or tranquilization to a warm-blooded animal comprising administering to said animal dipropylacetamido - 2 - pyrimidine in an amount to induce said sedation and tranquilization.

2. A composition for effecting tranquilization or sedation comprising an effective amount of dipropylacetamido-2 - pyrimidine and a physiologically acceptable carrier therefor.

3. The composition as defined in claim 2 wherein said physiologically acceptable carrier is a tablet.

4. The composition as defined in claim 2 wherein said physiologically acceptable carrier is a fluid suspension.

5. The composition as defined in claim 2 wherein said physiologically acceptable carrier is a capsule.

References Cited

UNITED STATES PATENTS

| | | | |
|---|---|---|---|
| 2,874,157 | 2/1959 | Traverso et al. | 260—256.4N |
| 3,317,534 | 5/1967 | Nitta et al. | 260—256.4N |

STANLEY J. FRIEDMAN, Primary Examiner